3,261,842
RECOVERY OF CYCLIC DICARBOXYLIC ACIDS
Walter Schenk, Heidelberg, Ludwig Vogel, Frankenthal, Pfalz, and Albrecht Wallis, Ludwigshafen (Rhine), Germany, assignors to Badische Anilin- & Soda-Fabrik Aktiengesellschaft, Ludwigshafen (Rhine), Germany
No Drawing. Filed Jan. 7, 1965, Ser. No. 424,110
Claims priority, application Germany, July 22, 1961, B 63,371
6 Claims. (Cl. 260—295)

This application is a continuation-in-part of application Serial No. 211,113, filed July 19, 1962, now abandoned.

The invention disclosed in the present application relates to the recovery of aromatic or pyridine dicarboxylic acids produced by heating salts of other aromatic or pyridine carboxylic acids.

It is known to produce aryl or pyridine dicarboxylic acids in which the two carboxyl groups are in the least hindered position on the aromatic or pyridine ring, by heating thallium or alkali metal salts, especially potassium salts or mixtures of potassium salts and sodium salts or other aryl or pyridine carboxylic acids in the absence or presence of catalysts, under pressure, advantageously in a carbon dioxide atmosphere, to a temperature of from 250° to 450° C. and thereby rearranging or disproportioning the initial corboxylic acids to the desired dicarboxylic acids. This reaction is used, for example, in the production of naphthalene-2,6-dicarboxylic acid from other naphthalenecarboxylic acids, especially from 1,8-naphthalenedicarboxylic acid (naphthalic acid); in the production of pyridine-2,5-dicarboxylic acid from other pyridine carboxylic acids, especially from pyridine-2,3-dicarboxylic acid; in the production of diphenyl-4,4'-dicarboxylic acid from other diphenyl carboxylic acids, especially from diphenyl-2,2'-dicarboxylic acid; and, most important industrially, in the production of terephthalic acid from other benzene carboxylic acids, especially from benzoic acid, o-phthalic acid and i-phthalic acid.

By thermal threatment of the said carboxylic acid salts a reaction mixture is obtained from which the free aryl or pyridine di-carboxylic acid must be isolated. A known method of isolating these acids comprises dissolving the reaction mixture in water or a water-soluble organic solvent and precipitating the free dicarboxylic acid by acidifying the solution. Mineral acids, carbon dioxide and organic acids have been used as acidifying agents. In this process, however, other acid components of the reaction mixture having similar solubilities to those of the desired dicarboxylic acids, e.g., benzoic acid and trimesic acid, are also precipitated and special purifying steps are necessary to obtain pure aromatic or pyridine dicarboxylic acids. Furthermore, when using mineral acids as acidifying agents the metal component of the salt is lost. Moreover, in all cases a crystal slurry is obtained which can be filtered or otherwise seperated only with difficulty.

According to an improved process the precipitation is performed in two steps. In the first step the acid salt of the desired carboxylic acid is precipitated and in the second step the free dicarboxylic acid is obtained. As acidifying agents, carbon dioxide, acid salts of cyclic dicarboxylic acids or those organic acids are used which serve as starting material for the thermal rearrangement or disproportionation. A process of the said kind is described, for example, in U.S. Patent No. 2,841,615. For example, potassium hydrogen terephthalate may be precipitated in a first step from a solution of dipotassium terephthalate by adding equivalent amounts of potassium hydrogen phthalate, a solution of dipotassium phthalate being obtained. In a second step, terephthalic acid may then be set free from the potassium hydrogen terephthalate by means of equivalent amounts of phthalic acid or phthalic anhydride, the dissolved potassium hydrogen phthalate being returned to the first step. The manufacture of initial salt and the liberation of terephthalac acid from the rearrangement mixture are thus combined in a beneficial manner. By using this two-step process for separating the dicarboxylic acids a higher degree of purity is achieved than by a one-step process. The degree of purity, however, is still not satisfactory if it is intended to use the dicarboxylic acids for the production of polyesters without any intermediate purifying step, e.g., conversion into the methyl ester. Furthermore, the two-step process requires careful and expensive control if consistent results are to be achieved. Moreover, there is considerable fluctuation in the yields, if the process of the said U.S. patent is applied to technical mixtures as obtained by the said thermal rearrangement or disproportionation rather than to pure salts if dicarboxylic acids, such as terephthalic acid. Addition of an equivalent amount of an aromatic monocarboxylic acid or an acid salt of a dicarboxylic acid then produces only incomplete precipitation of the acid salt of the desired dicarboxylic acid, the degree varying according to the content of byproducts in the commercial mixture.

It is an object of the present invention to provide a continuous process for the separation of aryl or pyridine dicarboxylic acids having the two carboxyl groups in the least hindered positions from a reaction mixture as obtained by thermal rearrangement or disproportionation of other aryl or pyridine carboxylic acids. A further object of the invention is to provide a process by which the desired dicarboxylic acids are obtained in a higher purity than hitherto from technical mixtures and sufficiently pure to be satisfactory for the production of polyesters without any further purification or other treatment. Another object of the invention is to provide a process for the separation of aryl or pyridine dicarboxylic acids having the two carboxyl groups in the least hindered positions from a reaction mixture as obtained by thermal rearrangement or disproportionation of other aryl or pyridine carboxylic acids, wherein the desired dicarboxylic acids can be filtered off without any difficulty. A further object of the invention is to provide a process for the separation of aryl or pyridine dicarboxylic acids from solutions of their salts, wherein the metal component of the salts can be recovered. Still another object of the invention is to provide a process for the separation of dicarboxylic acids from reaction mixtures as described above wherein no expensive control of the reaction is required. Yet a further object of the invention is to provide a process by which the acid may be recovered to a very large extent even from technical mixtures containing a neutral salt of the desired acid . Finally, it is an object of the present invention to provide a process by which the said dicarboxylic acids are obtained in readily crystallizable and readily separable form. Those and other objects and advantages of the invention will become apparent from the following detailed description of the invention.

It has been found that the said objects are accomplished by dissolving in water, a mixture of water with a low molecular weight water-soluble alcohol, or a mixture of water and a water-soluble ether, a reaction mixture comprising a dialkali metal salt of an aryl or pyridine dicarboxylic acid having the two carboxyl groups in the least hindered positions on the aromatic or pyridine ring, the said reaction mixture having been obtained by heating a neutral alkali metal salt of an aryl or pyridine carboxylic acid other than the said aryl or pyridine dicarboxylic acid to a temperature of from 250° to 450° C. at a pressure of from 1 to 30 atmospheres, advantageously in a carbon dioxide atmosphere and in the presence of a catalyst; filtering that solution obtained, if desired, to remove undissolved solids; continuously mixing the resultant solution in a first mixing zone at a temperature between 80° and 250° C. with an aryl or pyridine monocarboxylic acid or with an acid alkali metal salt of a polybasic aryl or pyridine carboxylic acid other than the said aryl or pyridine dicarboxylic acid in such an amount that the pH in the said mixing zone is constantly maintained between 4.1 and 6.5; cooling the mixture to a temperature substantially below 80° C., preferably between 20° and 30° C.; separating the precipitated acid alkali metal salt of the said aryl or pyridine dicarboxylic acid; slurrying the said acid alkali metal salt with water; mixing the resultant slurry at a temperature between 105° and 250° C. in a second mixing zone with an aryl or pyridine monocarboxylic acid or a polybasic aryl or pyridine carboxylic acid other than the said aryl or pyridine dicarboxylic acid or with an anhydride thereof in such an amount that the pH in the said mixing zone is constantly maintained between 2.1 and 4.5; cooling the mixture to a temperature below the temperature in the second mixing zone, preferably to 100° to 115° C.; and separating the precipitated dicarboxylic acid.

Suitable initial materials, the conditions for the rearrangement or disproportionation, suitable catalysts, and the pressure range applicable in the rearrangement or disproportionation are known in the art.

Suitable initial materials for the rearrangement or disproportionation include the alkali metal salts of aromatic and pyridine carboxylic acids other than aryl and pyridine dicarboxylic acids having the two carboxy groups in the least hindered positions on the aryl or pyridine ring. Examples are salts of benzene carboxylic acids having from 1 to 6 carboxyl groups, salts of naphthalene carboxylic acids having 1 or 2 carboxyl groups, salts of diphenyl carboxylic acids having 1 or 2 carboxyl groups, and salts or pyridine carboxylic acids having 1 or 2 carboxyl groups. Thus, terephthalic acid, naphthalene-2,6-dicarboxylic acid, diphenyl-4,4'-dicarboxylic acid or pyridine-2,5-dicarboxylic acid is obtained. Especially good results are achieved by using potassium salts or mixtures of potassium and sodium salts with a content of sodium salts of from 0.5 to 10 percent with reference to the alkali metal salts in the mixture. The carboxylic acid salts to be used include salts of benzoic acid, o-phthalic acid, isophthalic acid, naphthalic acid (naphthalene-1,8-dicarboxylic acid), pyridine-2,3-dicarboxylic acid, diphenyl-2,2'-dicarboxylic acid, hemimellitic acid, trimellitic acid, trimesic acid, mellophanic acid, prehnitic acid, pyromellitic acid, and mellitic acid. There may also be used salts of mixtures of the said carboxylic acids or salts of mixtures of carboxylic acids as obtained by air or nitric acid oxidation of graphite, coal, soft coal, peat, wood, lignin, extracts of coal, tars, pitches, coke or asphalts.

The thermal treatment is carried out by heating the salts of the said acids or acid mixtures in the absence of appreciable amounts of water to 250° to 450° C. at a pressure of from 1 to 30 atmospheres, advantageously in a carbon dioxide atmosphere. It is possible to use catalysts such as oxides, carbonates or halides of zinc, cadmium or divalent iron, and also organic salts of these metals, especially salts of the organic acids used as initial materials or obtained as end products in the thermal treatment.

The mixture resulting from the thermal rearrangement or disproportionation includes the salts of aryl or pyridine dicarboxylic acids having the two carboxyl groups in the least hindered position, as well as carbonates, small quantities of unconverted acids, byproducts, mostly of an acidic nature, some of them being of unknown constitution, carbonized products, and any catalyst used. The composition of these mixtures is usually as follows: salts of desired dicarboxylic acids, 85 to 98% by weight; salts of other acid products, 2 to 15% by weight; salts of carbonic acid, 0.5 to 2% by weight; other by-products, 0.5 to 3% by weight. Furthermore, the mixtures may contain small quantities, i.e., up to 5% by weight, of hydrides and/or carbides, particularly of potassium or sodium.

The reaction mixture is dissolved in water or a mixture of water and a water-soluble organic solvent to form a solution advantageously containing from 10 to 40% by weight of dissolved salts. As organic solvents may be used water-soluble low molecular weight alcohols, such as methanol, ethanol, propanol, isopropanol, ethylene glycol or water-soluble ethers such as dioxane or tetrahydrofuran. In the water/solvent mixture the water content should be at least 40% by weight with reference to the mixture. The solution is filtered if necessary to remove any undissolved impurities present, e.g., carbonized products and/or metal catalyst. The solution is heated to 80° to 250° C., preferably 100° to 180° C., and at this temperature an aryl or pyridine monocarboxylic acid or an acid salt of a polybasic aryl or pyridine carboxylic acid other than the dicarboxylic acid to be set free is added. In the case of the separation of terephthalic acid the first step may be represented by the following equation, monopotassium phthalate being used as the acidifying compound:

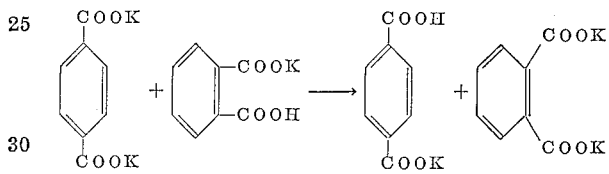

In the first stage, the acid salt of the particular dicarboxylic acid is precipitated. It is expedient to precipitate by means of a monocarboxylic acid, or an acid salt of a polybasic carboxylic acid, which by thermal rearrangement can be converted into the same dicarboxylic acid as is to be set free from the reaction mixture. In the case of terephthalic acid it is therefore advantageous to use benzoic acid or an acid alkali metal salt of a polybasic benzene carboxylic acid other than terephthalic acid having up to 6 carboxyl groups, e.g., phthalic acid or isophthalic acid. If naphthalene-2,6-dicarboxylic acid is set free, a naphthalene monocarboxylic acid or an acid alkali metal salt of another naphthalenedicarboxylic acid, such as naphthtalene-1,8-dicarboxylic acid, may for example be added. Similarly, a diphenyl monocarboxylic acid or an acid alkali metal salt of another diphenyl dicarboxylic acid is added if diphenyl-4,4'-dicarboxylic acid is to be set free. Pyridine-2,5-dicarboxylic acid is advantageously set free by adding a pyridine monocarboxylic acid or an acid alkali metal salt of another pyridine dicarboxylic acid. The said acid salts of polybasic carboxylic acid may contain one or more free carboxyl groups. Obviously, the more free carboxyl groups are contained in the molecule, the less is the amount required to set up the pH specified above. The said dicarboxylic acids having the carboxyl groups in the least hindered positions on the aryl or pyridine ring are so weak and difficulty soluble in the second dissociation stage that each carboxyl groups in any of the said precipitants will set free and precipitate the acid salt of the dicarboxylic acid used. ½ mole of a monopotassium salt of benzene tricarboxylic acid is therefore equivalent to 1 mole of the dipotassium salt of the same benzene tricarboxylic acid.

As the acid salt used for precipitation will eventually be converted into the dicarboxylic acid set free, it is advantageous to use acid potassium salts. Acid sodium salts may however also be used, especially in mixtures with potassium salts in which the proportion of sodium ions in the alkali metal ions does not exceed 10 mole percent.

The monocarboxylic acids or the acid metal salts of polybasic acids may be added either in solid form or dissolved or suspended in water or a mixture of water with a low molecular weight alcohol or a water-soluble ether as mentioned above.

In the process according to the invention it is essential that both the temperature specified for the first mixing zone and the said pH range should be constantly adhered to. If, as specified in U.S. Patent 2,841,615, the acid or acid salt is added in an amount equivalent to the amount of dicarboxylic acid to be separated, incomplete separation and a less pure product are obtained. When working outside the said temperature range, the dicarboxylic acid obtained is also less pure. The particularly preferred pH within the range specified depends on the type of dicarboxylic acid to be set free. In the case of terephthalic acid, the preferred range is from 5.4 to 6.1, especially from 5.5 to 5.8. For naphthalene-2,6-dicarboxylic acid the corresponding range is from 5.0 to 6.0, especially 5.3 to 5.7, and for pyridine-2,5-dicarboxylic acid, 4.1 to 4.6.

On introducing the acid salt into the first mixing zone, carbon dioxide is formed owing to excess carbonate being present in the reaction mixture. It is advantageous to remove carbon dioxide by applying a vacuum to avoid inclusion of carbon dioxide in the precipitate. The presence of carbon dioxide would make such mixtures difficult to filter.

The conversion of the dialkali metal salts of the abovementioned dicarboxylic acids into the monoalkali salts requires only a short period, e.g., 1 minute. However, it is advantageous to keep the reaction mixture at the temperature mentioned for a longer period than is necessary for the conversion, e.g., up to 3 hours, in order to obtain very regular, well formed crystals. The reaction mixture is then cooled to a temperature substantially below the precipitation temperature in the first mixing zone, for example to 50° to 60° C. It will be understood, however, that the less monoalkali metal salt will remain dissolved the lower the temperature. It is expedient to cool to 20° to 30° C. The precipitate is then separated, for example by centrifuging or filtering.

The filtrate can be used for a further thermal rearrangement after adding, if desired, a catalyst and removal of the water. The separated monoalkali metal salt is mixed with water to form a slurry which preferably contains from 10 to 50 parts of solid in 100 parts of mixture. The mixture is heated in a closed vessel to 105° to 250° C., preferably 140° to 180° C., while the pressure adjusts itself, e.g., at a temperature of 105° C. to 1.1 atmosphere or at 250° C. to 40 atmospheres. However, it is also possible to heat at a higher pressure, e.g., by forcing in an inert gas, such as nitrogen.

At the said temperature the slurry is mixed in a second mixing zone with an aryl or pyridine monocarboxylic acid or a polybasic aryl or pyridine carboxylic acid other than the dicarboxylic acid to be set free or an anhydride thereof as acidifying agent, the ratio being chosen so as to constantly maintain a pH of from 2.1 to 4.5. The free dicarboxylic acid having the two carboxyl groups in the least hindered positions on the aryl or pyridine ring is thus obtained as precipitate, while the precipitant is converted into an alkali metal salt that remains dissolved. The reaction of potassium hydrogen terephthalate with phthalic anhydride may be represented as follows:

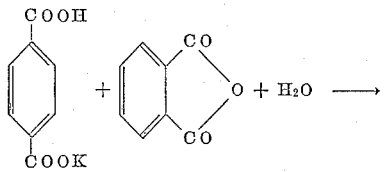

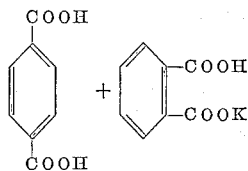

It is possible to use the monocarboxylic acids that may be used in the first precipitation step, and the polybasic carboxylic acids (or their anhydrides) whose acid alkali metal salts may be used in the first precipitation step. The choice of the carboxylic acids or carboxylic anhydrides should preferably be made according to the principles outlined above, i.e., the precipitant used should be capable of being eventually rearranged into the dicarboxylic acid set free in the second mixing zone. As in the first precipitation, the precipitant for the second precipitation may be added either in substance or in the form of an aqueous solution or suspension.

In the process according to the present invention it is essential that both the temperature specified for the second mixing zone and the said pH range should be constantly adhered to, as otherwise dicarboxylic acids of lesser purity are obtained. The most favorable pH within the range specified depends on the dicarboxylic acid set free. In the case of terephthalic acid it is from 3.6 to 4.3, preferably from 3.9 to 4.1. For naphthalene-2,6-dicarboxylic acid the corresponding range is from 3.5 to 4.5, and for pyridine-2,5-dicarboxylic, from 2.1 to 3.0. The mixture should not be acidified to a higher pH than specified above, as otherwise undesired acid compounds may be simultaneously precipitated and these may become occluded in the desired dicarboxylic acid.

After adding the acidifying agent the mixture is cooled to a temperature below that prevailing in the second mixing zone, preferably to 100° to 115° C., e.g., by releasing the pressure. It is advantageous to maintain the mixture at this temperature for about 1 to 3 hours in order to obtain regularly formed crystals. Particularly satisfactory crystallization can be achieved by gradual cooling, the small crystals going into solution and then growing onto larger ones. The free aryl or pyridine dicarboxylic acid is preferably separated at a temperature of 100° to 115° C., for example by centrifuging. The filtrate from the second stage can be used for acidifying the mixture in the first stage.

It is advisable to stir the reaction mixture intensively in both precipitation stages. Furthermore, it is convenient to add the acidifying agent using a system controlled by a pH meter arranged in the mixture to be acidified.

The cyclic dicarboxylic acids recovered according to the invention can be used without any further purification for the production of polyesters, e.g., with ethylene glycol or 1,4-bis-hydroxymethylcyclohexane.

The invention is further illustrated by the following examples without being restricted thereto. The parts and percentages specified in the examples are by weight.

*Example 1*

222 parts dipotassium terephthalate manufactured by the thermal treatment of dipotassium phthalate in the presence of 1% cadmium catalyst under carbon dioxide at a pressure of 10 atm. gage and at a temperature of 435° C. and containing 10.8 parts potassium carbonate and 7 parts potassium benzoate is dissolved every hour in 1224 parts water, and separated from undissolved catalyst and carbonized residues by means of a separator. A metering pump is used to continuously feed a variable amount of dipotassium terephthalate through a spray nozzle into an agitated vessel which is also used as a precipitation and crystallization vessel, while a further metering pump is used to feed in from a storage vessel 227 parts per hour potassium hydrogen o-phthalate dissolved in 555 parts water at from 95° to 100° C. and recovered from the second precipitation stage. The precipitation vessel is under a slight vacuum (10 mm. water column) and is maintained at a temperature of 95° to 100° C. The overacidification brought about in the precipitation vessel by the introduction of the potassium hydrogen phthalate immediately brings about the decomposition of excess carbonate present; the carbon dioxide thus liberated is continuously removed by the vacuum. The addition of the correct amount of dipotassium terephthalate is effected by varying the stroke of the metering pump by means of a pH controller set to a pH range of from 5.5 to 5.8, while the level of the liquid in the precipitation vessel, and hence the residence time, is kept constant by means of a float valve. Slurry is continuously removed via the lower outlet of the vessel by means of a circulating pump, whereupon it is returned to the top of the precipitation vessel after flowing through a pH measuring cell having antimony electrodes in order to effect adjustment of the pH value. The circulation procedure reinforces the effect of the stirrer in the vessel and encourages the settling out of the heavier and hence larger and more readily filterable crystals, while at the same time the smaller and specifically lighter potassium hydrogen terephthalate crystals with a diameter of less than $2\mu$ go into solution and grow onto the larger crystals in the upper portion of the vessel.

After adjusting the reaction conditions, the reaction mixture is pumped from the circulating system of the precipitation vessel at a rate of 2045 parts per hour into a further agitated vessel, the mixture being simultaneously subjected to cooling down to 20° to 30° C. The new agitated vessel is also fitted with a circulating pump and a liquid level controller. The acid terephthalate mixture is circulated in order to complete the crystallization process over a further period of 110 minutes. This residence time gives rise to very regular, well formed crystals with an average particle size of between 5 and $92\mu$, the majority of the crystals having a size greater than $30\mu$. After cooling down to 20° to 30° C., the reaction mixture obtained in this manner can be readily separated on a continously operating centrifuge (decanter) into which an appropriate quantity of the mixture is led off continuously from the circulating system. The residue is washed out continuously with cold water fed in at a rate of 94 parts per hour, and recovered in the form of a slurry containing 182.5 parts potassium hydrogen terephthalate as well as 25 parts dipotassium phthalate. The filtrate running off from the centrifuge contains the whole of the dipotassium phthalate portion of the mixture together with 7 parts potassium benzoate and 2 parts potassium hydrogen terephthalate.

After addition of an appropriate amount of catalyst, neutralization, and evaporation to dryness, the filtrate can be subjected to thermal conversion to terephthalate. The solid component which comprises, in addition to water, 182.5 parts potassium hydrogen terephthalate and 25 parts dipotassium phthalate, is diluted with 337 parts water in the course of 1 hour in a conical agitated vessel, and is continuously pumped by means of a metering pump into a precipitation vessel fitted with a stirrer and the mixture is heated by steam at a pressure of 3.5 atm. to a temperature of 140° C. Liquid phthalic anhydride is pumped through a separate line into the precipitation vessel by means of a heated metering pump from a storage vessel in which the phthalic anhydride is maintained in a molten state at a temperature of 140° to 150° C. The precipitation temperature is kept constant at 140° to 145° C. by means of steam, and the pH value is maintained between 3.9 and 4.1, the precise adjustment of this value being effected by controlling the phthalic anhydride metering pump by means of an antimony electrode pH controller. A residence time of 240 minutes is established by circulating the reaction mixture which comprises a slurry made up of the precipitated terephthalic acid present as a solid and a 27% solution of potassium hydrogen phthalate; a circulating pump is used and the level within the precipitation vessel is kept constant.

The reaction mixture is led off from the circulating system of the precipitation vessel at a rate of 853 parts per hour into an adjoining agitated vessel, water evaporating from the mixture as a result of release of pressure, while at the same time the slurry product which has already been relieved of pressure is fed in through a three-way valve. This slurry is circulated in the agitated vessel for 120 minutes in order to complete crystallization at a temperature of 109° C. A particularly pure terephthalic acid with a uniform particle size, where 88 percent of all crystals have a size lying between 5 and $40\mu$, is obtained as a result of the crystallization and grading achieved by this means.

The separation of the precipitated terephthalic acid from the salt solution is carried out at a temperature of 105° to 108° C. by means of a centrifuge. 150 parts terephthalic acid is separated hourly and this is washed with 550 parts water and steam. The terephthalic acid thus obtained possesses a particularly high degree of purity, has an acid content of 99.9%, and, as a result of its good color and purity, requires no intermediate purification when it is used, for example, for direct esterification with glycol to polyester. Polyesters thus prepared have a Hazen number of 0 to 10, while polyester prepared with terephthalic acid obtained according to U.S. Patent 2,841,615 has a Hazen number of 100 to 300.

The mother liquor which comprises a concentrated solution of potassium hydrogen phthalate is used as the precipitating agent in precipitation step I.

If precipitation is effected by the process described in Example 2 of U.S. Patent No. 2,841,615, the following analytical results are obtained:

|  | Purity of the precipitated terephthalic acid | |
|---|---|---|
|  | On precipitating in the manner known from U.S. Patent 2,841,615 | On precipitating by the present process |
| Terephthalic acid content (precipitated with $SO_2$). | 99.54% | 99.9% (determination limit). |
| Acid number | 675 | 675. |
| Ash content | 0.03% | 0.002%. |
| Potassium | 0.004% | 0.0002%. |
| Iron (III) content | 0.008% | 0.0007%. |
| Iron (II) content | 0.0005% | 0.0001% (determination limit). |
| Color rating in N/1 KOH solution. | 10 | 1. |
| Phthalic acid content (gas chromatography). | 2,200 p.p.m | 20 p.p.m. (determination limit). |
| Benzoic acid content | 840 p.p.m | Do. |
| Trimesic acid content | 230 p.p.m | Do. |
| Hazen number of polymer (according to ASTM) with ethylene glycol. | 250 | 8. |

*Example 2*

48.5 parts dipotassium terephthalate is dissolved in 500 parts water in a pressure vessel equipped with a stirrer, and reacted slowly with benzoic acid at a temperature of 95° C. until the pH value of the reaction solution becomes constant at 5.75 (measured at 82° C.), the said dipotassium terephthalate having been obtained in the known manner by the thermal conversion of potassium benzoate in the presence of 2% zinc benzoate as catalyst at a reaction temperature of 450° C. under carbon dioxide at a pressure of 21 atm.

24.4 parts benzoic acid is used in the reaction. The crystallization of the precipitated potassium hydrogen terephthalate is carried out in the manner described in Example 1 for the precipitation of potassium hydrogen phthalate, with the object of obtaining a product with a very high degree of purity and uniform particle size combined with good filtering properties. After a residence time of about 90 minutes and cooling to 25° to 30° C., the separation of the precipitated potassium hydrogen terephthalate (40.8 parts) from the dissolved potassium benzoate is effected by centrifuging and then washing with 20 parts water at 40° C. A terephthalic acid compound is no longer detectable in the filtrate when a sample of it is acidified with a mineral acid to bring the pH value to about 2.

The 40.8 parts potassium hydrogen terephthalate obtained in the first precipitation step is made into a slurry with 500 parts water in an agitated pressure vessel which is then heated to 150° C., the steam pressure being raised to 3.6 atm. As much benzoic acid is added within an hour as is required to establish a constant pH value of 4.0. The quantity of benzoic acid used is 24.5 parts. The crystallization and separation of the precipitated terephthalic acid are carried out in the manner described in Example 1. After drying, 33.2 parts terephthalic acid with an acid number of 675 and excellent color rating are obtained. No benzoic acid can be detected in it.

The filtrate which consists of potassium benzoate, is combined with the solution of potassium benzoate in the filtrate obtained from the first precipitation step, and, after adding the appropriate quantity of zinc catalyst, it is evaporated to dryness and used as a starting material in the well-known process of thermal disproportionation into dipotassium terephthalate and benzene.

If the same quantity of dipotassium terephthalate (48.5 parts) is precipitated by the addition of 48.9 parts benzoic acid at the same temperature, but in a single-step precipitation process and without adhering to the pH and crystallization conditions described, the reaction solution has a pH value of only 4.45 after precipitation and comprises a mixture of terephthalic acid, acid terephthalate, benzoic acid and potassium benzoate. After separating off the filtrate, only 10 parts of a yellowish colored terephthalic acid with an acid number of 660 is obtained as solids. On further acidifying the filtrate with 20.5 parts benzoic acid or the equivalent quantity of mineral acid, the remainder of the terephthalate used can be precipitated. However, the terephthalic acid obtained in this case always comes down in an impure slimy form, and can therefore not be used directly for the manufacture of linear polyester.

Example 3

165 parts of a catalyst-containing reaction mixture comprising the dipotassium salt of a mixture of the cis and trans isomers of 1,4-cyclohexanedicarboxylic acid obtained by known methods is dissolved in 700 parts water and 375 parts alcohol, and the residue containing carbonized products and catalyst is filtered off from the solution. Then so much potassium hydrogen phthalate is added to the neutral dipotassium salt solution that a pH value of 5.4 is attained when the mixture is heated to 115° C. in an autoclave fitted with a stirrer. 135 parts monopotassium phthalate is required for the purpose. After cooling to 30° to 35° C., the precipitate comprising the difficultly soluble potassium salt of cyclohexanedicarboxylic acid is filtered off and washed with 75 parts of a cold water/alcohol mixture; the filtrate, which contains dissolved dipotassium phthalate, is evaporated to dryness and, after addition of the required amount of catalyst, is subjected to thermal conversion to dipotassium terephthalate. The moist filter cake of the potassium hydrogen salt of cyclohexanedicarboxylic acid is then made up into a slurry with 225 parts water in an agitated autoclave into which molten phthalic anhydride is injected until a pH value of 4.1 has been attained. After stirring for 1 hour at 135° C., the mixture is allowed to cool to 50° C. and the practically precipitated 1,4-cyclohexanedicarboxylic acid is filtered to remove dissolved potassium hydrogen phthalate which is used as a precipitating agent in the first precipitation step, and washed thoroughly with 75 parts cold water. After drying, 109 parts of almost colorless cyclohexanedicarboxylic acid of a high degree of purity and an acid number of 651 is obtained. If the precipitation is carried out by strongly acidifying with phthalic acid or phthalic anhydride without controlling the pH, and without simultaneous crystallization, a yellowish colored product containing phthalic acid as an impurity is obtained; this product cannot be used without further treatment for reactions in which a high degree of purity is required.

Example 4

198 parts of the dipotassium salt of 2,5-pyridinedicarboxylic acid prepared in the known manner by the thermal treatment of the dipotassium salt of 2,3-pyridinedicarboxylic acid in the presence of a cadmium salt as catalyst, is dissolved in 630 parts water at 60° C. For the removal of troublesome colored by-products, the red-brown, alkaline solution containing both catalyst and carbonaceous residue is treated in the known manner with carbon dioxide while being stirred until a pH value of 8.5 has been established in the solution, no potassium hydrogen salt of isocinchomeric acid being precipitated. After adding 2 parts activated carbon, the solution is cooled to room temperature while stirring is continued, and insoluble residues are filtered off from the salt solution. In the following first precipitation step, monopotassium salt of 2,3-pyridinecarboxylic acid (quinolinic acid), which serves as the initial substance, is added gradually to the clear filtrate in an agitated pressure vessel which is heated to 105° C. until a constant pH value of 4.3 is reached. 171 parts of acid salt of quinolinic acid is used for this purpose. The reaction mixture is then cooled down to 5° to 10° C., 180 parts methanol is added, and the precipitated potassium hydrogen salt of isocinchomeric acid is separated from the dipotassium salt of quinolinic acid in the solution by filtration. After evaporating the filtrate to ⅓ of its volume and adding 120 parts methanol the remainder of the acid isocinchomerate is precipitated from the mother liquor and, after separating off, added to the main quantity. The whole is reacted in the second precipitation step carried out in an agitated pressure vessel with a quantity of 20% aqueous quinolinic acid solution at 130° C. sufficient to set up a pH value of 2.3. The reaction mixture is cooled down to 30° C. in the course of 1 hour and the precipitate comprising isocinchomeric acid is filtered off from the mother liquor which contains all the 2,3-pyridinecarboxylic acid used for precipitation, in the form of a readily soluble potassium acid salt, and this is used as the precipitating agent in the subsequent first precipitation step. After drying, 127 parts of a particularly pure isocinchomeric acid is obtained and this exhibits a sulfuric acid color rating of 5, while a sample precipitated with excess acid without adhering to the foregoing crystallization conditions gives a color rating of 300–400.

It will be understood that the process disclosed and illustrated in the foregoing description and examples can be modified in various ways without departing from the basic concept of the invention. Thus, for example, thallium (I) salts may be used instead of alkali metal salts, although this is less preferred for economic reasons. Heterocyclic carboxylic acids other than pyridine-2,5-dicarboxylic acid, such as pyrrole-2,5-dicarboxylic acid, furan-2,5-dicarboxylic acid and quinoline-2,4-dicarboxylic acid, may also be recovered from reaction mixtures. Hydrogenated aryl dicarboxylic acids such as cyclohexane-1,4-dicarboxylic acid may also be set free from their alkali metal salts by the process according to the present invention by using two steps and maintaining specific tempeartures and pH values in each step. Also, mixtures of water with alcohols or ethers as mentioned in the first step may be used instead of water in the second step, water being preferred merely for economic reasons. These and similar modifications of the process are part of the present invention if and whenever use is made of the essential features, i.e., precipitation in two steps at the pH values and temperatures specified.

We claim:
1. A process for the recovery of cycli dicarboxylic acids which comprises: dissolving in a member selected from the class consisting of water, a mixture of water with a low molecular weight water-soluble alcohol and a mixture of water with a water-soluble ether, a reaction mixture comprising a dialkali metal salt of a dicarboxylic acid selected from the class consisting of terephthalic acid, naphthalene-2,6-dicarboxylic acid, diphenyl-4,4'-dicarboxylic acid and pyridine-2,5-dicarboxylic acid, said reaction mixture having been obtained by heating a neutral alkali metal salt of an acid selected from the class consisting of aryl and pyridine carboxylic acids other than said dicarboxylic acids to a temperature of from 250° to 450° C. at a pressure of from 1 to 30 atmospheres; continuously mixing the resultant solution in a first mixing zone at a temperature of from 80° to 250° C. with a member selected from the class consisting of aryl and pyridine monocarboxylic acids and an acid alkali metal salt of polybasic aryl and pyridine carboxylic acids other than said dicarboxylic acids in such an amount that the pH in said first mixing zone is constantly maintained at from 4.1 to 6.5; cooling the resultant mixture to a temperature substantially below 80° C.; separating the precipitated acid alkali metal salt of said dicarboxylic acids; slurrying said acid salt with water; mixing the resultant slurry in a second mixing zone at a temperature of between 105° and 250° C. with a member selected from the class consisting of an aryl and a pyridine monocarboxylic acid, polybasic aryl and pyridine carboxylic acids other than said dicarboxylic acids and anhydrides of said polybasic aryl and pyridine carboxylic acids in such an amount that the pH in said second mixing zone is constantly maintained at from 2.1 to 3.4; cooling the resultant mixture to a temperature below the temperature in said second mixing zone; and separating the precipitated dicarboxylic acid.

2. A process as claimed in claim 1 wherein the dicarboxylic acid to be recovered is terephthalic acid, and the pH value in said first mixing zone is maintained at from 5.4 to 6.1, and the pH value in said second mixing zone is maintained at from 3.6 to 4.3.

3. A process as claimed in claim 1 wherein the dicarboxylic acid to be recovered is pyridine-2,5-dicarboxylic acid, and the pH value is maintained at from 2.1 to 4.6 in the first step and at from 2.1 to 3.0 in the second step.

4. A process as claimed in claim 1 wherein the dicarboxylic acid to be recovered is naphthalene-2,6-dicarboxylic acid, and the pH value is maintained at from 5.0 to 6.0 in the first step and at from 3.5 to 4.5 in the second step.

5. A process as claimed in claim 1 wherein the mixture obtained in said first mixing zone is cooled to 20° to 30° C. and the precipitate obtained is separated at said temperature.

6. A process as claimed in claim 1 wherein the mixture obtained in said second mixing zone is cooled to a temperature of between 100° and 115° C. and the precipitate obtained is separated at said temperature.

References Cited by the Examiner
UNITED STATES PATENTS 2,841,615   7/1958   Schutt et al. _____ 260—525

WALTER A. MODANCE, *Primary Examiner.*
A. L. ROTMAN, *Assistant Examiner.*